United States Patent
Fischer et al.

(10) Patent No.: US 7,397,352 B2
(45) Date of Patent: Jul. 8, 2008

(54) METHOD AND DEVICE FOR LOCALIZING THE POSITION OF AT LEAST TWO EMISSION UNITS, ESPECIALLY FOR MONITORING AT LEAST ONE PARAMETER FOR A PLURALITY OF WHEELS PERTAINING TO A MOTOR VEHICLE

(75) Inventors: Frank Fischer, Regensburg (DE); Jürgen Spotka, Tournefeuille (FR)

(73) Assignee: Siemens Aktiengesellschaft, Munich (DE)

( * ) Notice: Subject to any disclaimer, the term of this patent is extended or adjusted under 35 U.S.C. 154(b) by 298 days.

(21) Appl. No.: 10/543,179

(22) PCT Filed: May 19, 2004

(86) PCT No.: PCT/EP2004/050865

§ 371 (c)(1),
(2), (4) Date: Jul. 22, 2005

(87) PCT Pub. No.: WO2005/005172

PCT Pub. Date: Jan. 20, 2005

(65) Prior Publication Data

US 2006/0152353 A1    Jul. 13, 2006

(30) Foreign Application Priority Data

Jul. 10, 2003    (DE) ................. 103 31 314

(51) Int. Cl.
*B60C 23/00*    (2006.01)

(52) U.S. Cl. .............. 340/447; 340/442; 340/444; 340/445; 340/446; 73/146.2; 73/146.5; 73/156.8; 116/34 R

(58) Field of Classification Search ................. 340/442, 340/444, 445, 446, 447, 448; 200/61.22; 116/34 R; 73/146.2, 146.3, 146.5, 146.8; 701/9, 74
See application file for complete search history.

(56) References Cited

U.S. PATENT DOCUMENTS

| 5,808,190 A | 9/1998 | Ernst |
| 6,181,241 B1 | 1/2001 | Normann et al. |
| 6,690,271 B2 * | 2/2004 | Fischer et al. ............... 340/447 |
| 6,922,140 B2 * | 7/2005 | Hernando et al. ........... 340/444 |

(Continued)

FOREIGN PATENT DOCUMENTS

DE    196 08 479 A1    5/1997

(Continued)

*Primary Examiner*—Hung Nguyen
(74) *Attorney, Agent, or Firm*—Laurence A. Greenberg; Werner H. Stemer; Ralph E. Locher

(57) ABSTRACT

The invention relates to a method and a device for localising the position of at least two emission units, especially for monitoring at least one parameter for a plurality of wheels pertaining to a motor vehicle. The average power of the reception signals of a central evaluation and control unit (5) is detected. The aim of the invention is to improve the reliability of a correct localisation. To this end, at least two association criteria are used to associate the reception signals or emission units with positions or regions, when the examination of a reliability criterion for the first association criterion does not produce a sufficiently high reliability for the association carried out.

18 Claims, 2 Drawing Sheets

U.S. PATENT DOCUMENTS

| | | | |
|---|---|---|---|
| 6,960,994 B2 * | 11/2005 | Tabata et al. | 340/442 |
| 7,032,441 B2 * | 4/2006 | Kanatani et al. | 73/146 |
| 7,196,615 B2 * | 3/2007 | Nicot et al. | 340/442 |
| 2003/0020604 A1 | 1/2003 | Fischer et al. | |
| 2006/0017554 A1 * | 1/2006 | Stewart et al. | |

FOREIGN PATENT DOCUMENTS

| | | |
|---|---|---|
| DE | 101 35 936 A1 | 2/2003 |
| EP | 0 806 306 A2 | 11/1997 |
| EP | 0 931 679 A1 | 7/1999 |

* cited by examiner

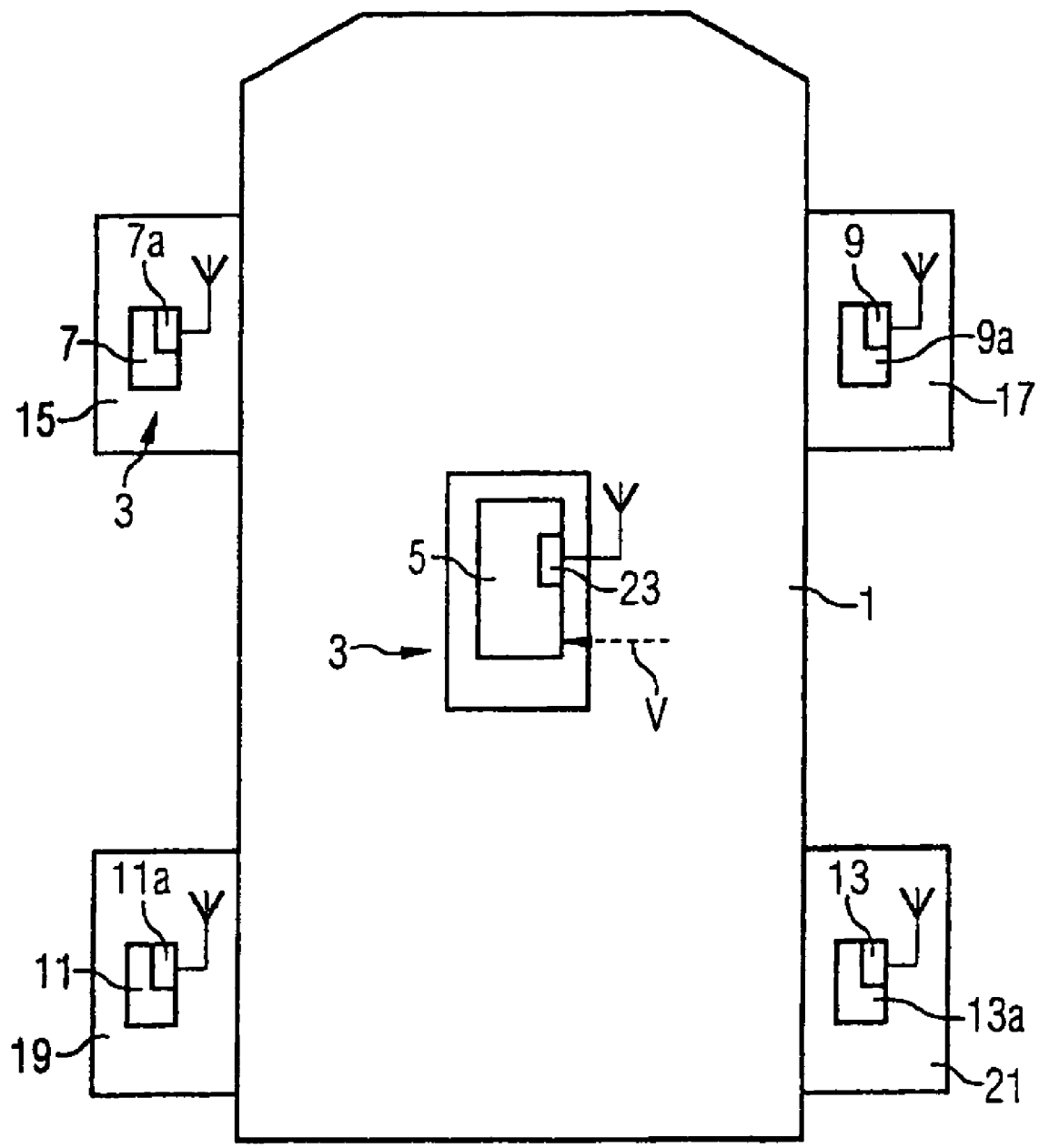

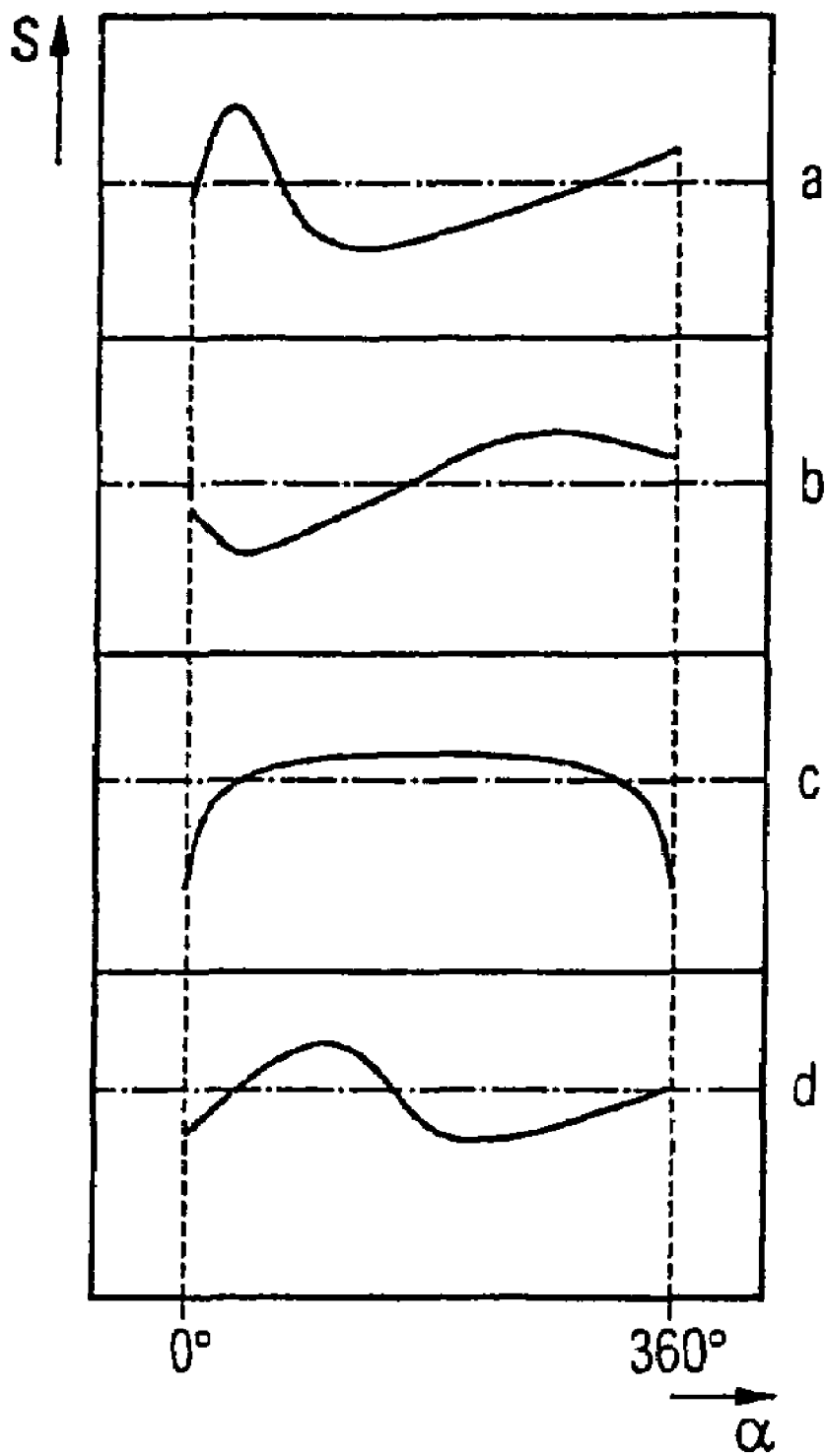

METHOD AND DEVICE FOR LOCALIZING THE POSITION OF AT LEAST TWO EMISSION UNITS, ESPECIALLY FOR MONITORING AT LEAST ONE PARAMETER FOR A PLURALITY OF WHEELS PERTAINING TO A MOTOR VEHICLE

BACKGROUND OF THE INVENTION

Field of the Invention

The invention relates to a method and device for localizing the position of at least two emission units, especially for monitoring at least one parameter for a plurality of wheels pertaining to a motor vehicle.

Monitoring the parameters of a wheel of a motor vehicle, for example, the tire pressure or the tire temperature is important for the reliability of the vehicle and/or the safety of the driver of the vehicle. In order to make the manual examination of such parameters unnecessary, devices were developed by means of which it is possible to automatically detect the important parameters of the wheels of a motor vehicle and to indicate them, for example, by means of corresponding display devices in the instrument panel. Because the usual requirement is to not only show the parameters, but also to ambiguously allocate the parameters shown to the position of the relevant wheel, it is necessary to develop such a device in such a way that this allocation is also retained or can be re-initialized after a wheel has been changed.

To this end it is known that a receiver unit has to be allocated to each detector device which has been fitted to a wheel, in each case, and said receiver unit provided in the vicinity of the relevant wheel position. In this way, on the basis of the intensity of the signals received by a receiver unit it is possible to determine the signal of the neighboring detector device, in each case, by selecting the signal with the highest intensity. For this purpose it is assumed that the detector devices of the wheels of a motor vehicle essentially transmit with the same transmitting power so that the signal of the immediately neighboring wheel in each case or the neighboring detector device has the highest signal intensity at the receiving point.

However, a disadvantage of such a device is the fact that each wheel requires a receiving device whose reception signal then has to be connected via a line to a central evaluation and control unit or directly to a display unit.

From EP-A-0 806 306, an air pressure control system is known in which the allocation of the positions of the wheels to the air pressure control devices which are fitted to the wheels is made possible by the fact that with the air pressure control devices and in each case with an additional measuring device allocated to the wheels, an additional parameter is detected for each wheel. In this case, it can, for example, be the speed of the wheels. To this end, the air pressure control devices do not only transmit the measured values for the air pressure, but also measured values for the additional parameters to a central unit. Because for the same additional parameters, measured values are also transmitted from the additional measuring devices to the central unit, said central unit can, by comparing the measured values for the additional parameter allocate an air pressure control device to a wheel position if the measured value supplied by the relevant air pressure control device for the additional parameter corresponds accurately enough with the relevant measured value of the parameter of an additional measuring device. This is so because the additional measuring devices are fitted securely to the motor vehicle (not on the wheel) and as a result of this remain allocated permanently to a specific position of the wheel.

A disadvantage of this device is the fact that additional costs are incurred for the two sensors for detecting the additional parameter. Even if the additional parameters can be detected with that sensor which is anyhow provided on the wheel for detecting the air pressure, an additional sensor fitted securely to the vehicle is required per wheel for detecting the additional parameter.

Finally, from EP-A-O 931 679, a method for allocating the position of a wheel of a motor vehicle is known in which the transmission signals of the emission units allocated to the wheel are transmitted to a central receiver unit and an evaluation unit and in which the different characteristic effects of the individual transmission paths when the wheels are rotating are extended to the specific reception signal in order to allocate the signals to the positions of the wheels. This involves comparing the envelope of the reception signal which is amplitude-modulated by the time-variant changes of the transmission characteristics with stored signatures. However, a disadvantage is the fact that detecting and evaluating the envelope of said signal is relatively costly. This requires both a large memory and extensive computation.

BRIEF SUMMARY OF THE INVENTION

Therefore it is the object of the invention to create a method and a device for localizing the position of at least two emission units, especially for monitoring at least one parameter for a plurality of wheels pertaining to a motor vehicle, with localizing able to be carried out in a simple way and with the required reliability, while at the same time aiming to keep hardware costs as low as possible.

The invention is based on the finding that, in the case of data transmission by means of a preferably phase-modulated or frequency-modulated signal, the signal power occurring at the receiving point of a central evaluation and control unit is influenced by the characteristics of the transmission path between the detector unit fitted to a wheel and the evaluation and control units. In this case, the characteristics of the transmission path are determined on the one hand by the angular position of the wheel and thereby the position of the detector unit and on the other hand by the parts or regions of the motor vehicle influencing the signal transmitted from the relevant angular position. In practice it has been shown that when the wheels are rotating, the transmission paths are in each case different in the different positions of the wheels and are at the same time a characteristic feature of the positions of the wheels.

Therefore, according to the invention the average signal power of the reception signal of an evaluation and control unit is preferably evaluated in order to make possible the allocation of a reception signal or the relevant emission unit to a wheel position or an axle position.

Generally speaking, a part N of the emission units is allocated to a first transmitter group and the other part M of the emission units to a second transmitter group in which case a local region is allocated to each transmitter group, for example, the position region "rear axle" or the position region "front axle". This forming of transmitter groups can either be carried out for reasons of a more simple evaluation or because the transmission paths anyhow do not influence the transmitted signals to such a different extent that these, at the location point of the receiver antenna of the receiver unit, have a sufficiently different (averaged over a long period of time) average power and as a result by only carrying out a simple evaluation of the average power, a distinction can hardly be made or in any case not with the required reliability.

However, individual emission units can as a matter of course also be localized with the method according to the invention. Especially, the method of dividing the emission units into two groups can be used repeatedly in succession. For example, after allocating the emission units to the two transmitter groups, the method can on the other hand again be used on each one of the two groups, i.e. each group is again divided into two subgroups in its turn.

According to the invention, the N emission units of all the N+M emission units are in each case allocated with the N highest average values of the reception signal to the first transmitter group and thereby allocated to the relevant local region and the M emission units with the M lowest average values of the reception signal to the second transmitter group or the relevant local region in each case.

The minimum interval of the average power of the reception signals of the two transmitter groups is used as a measure of the reliability of the allocation; in other words: That reception signal standing at the Nth position in the ranking of decreasing average power and the signal in the (N+1)th position are evaluated. As a measure of the interval it is, for example, possible for the absolute difference in level of the signals or the ratio of the signals to be evaluated. If the interval exceeds a predetermined threshold value, then the result of the allocation carried out in the said manner (with sufficient reliability) will be deemed to be applicable. Otherwise, at least one additional decision criterion is used for allocating the reception signals or the relevant emission units to the transmitter groups or their local regions and/or an additional criterion for testing the reliability of the correct allocation, preferably by using additional characteristic variables of the reception signals.

According to an embodiment of the invention, the final result of the allocation is only deemed to be correct if all the allocation results, by using the one decision criterion or a plurality of additional decision criteria, correspond with the first allocation result and possibly even then if the first and also all the additional decision criteria yield a negative result when testing the reliability of a correct allocation. The allocation can also be deemed to be correct even if the application of the last criterion for testing the reliability of the allocation should reveal that the reliability of the reliability is insufficient. In this case, because of the correspondence of the allocation results as such, a sufficient reliability can be assumed.

Otherwise, the allocation result is rejected and an error signal is generated if necessary.

Therefore the overall execution sequence of the method is as follows: First of all, an allocation of the emission units to the transmitter groups or their local regions is carried out by evaluating the average values of the reception signals and the reliability of the allocation is evaluated by using the first criterion for examining the reliability. In the level of reliability is sufficient, the method ends. Otherwise, an additional criterion for allocating the emission units is used and the result is checked by using an additional reliability criterion. If the last criterion made available for the specific method applies in this case and in the case of a correspondence of the allocation results, even if the last reliability criterion yields a negative result, i.e. displays an insufficient reliability (when using the last criterion for the allocation), the allocation is assumed to be correct. If the allocation results do not correspond, the method will be terminated with an error message and an error signal will be generated if necessary. If the last criterion made available for the specific method does not apply in this case, then in the case of a negative result when examining the reliability, the next criterion to be used will be applied, etc.

In the case of the preferred embodiment of the method, the reception signals are scanned intermittently or intermittent transmitted signals are used. For example, each emission unit can send its telegram at predetermined intervals (e.g. every 5 seconds), said telegram containing both an identification code and information to be transmitted. The telegram can consist of a plurality of parts, e.g. a plurality of short parts in time, in which a signal is actually transmitted, which are in each case separated by a pause of a specific duration in time.

The individual telegram parts in which a signal transmission takes place can be so short that for these a discreet value can in each case be detected for the average value of the relevant modulating signal without having to generate an excessively high integrating action in view of the dependence of the signal in time on a possible change in the angle position of the relevant wheel. As an additional characteristic variable for the reception signals, the number of these discrete reception signal values which is greater or less than a predetermined discriminator threshold value can then be determined, in which case a minimum number of such discrete reception signal values is preferably detected for each reception signal and the relative frequency of the reception signal values above or below the threshold value is determined for each reception signal.

The allocation can then take place in such a way that those N reception signals or emission units are allocated to the first transmitter group producing the N highest relative frequencies. The allocation to the second transmitter group takes place for those M reception signals or emission units for which the M lowest relative frequencies are produced.

In this case the allocation can be undertaken very generally by detecting the identification code of the relevant reception signal and its allocation to the relevant transmitter group.

As a test of the reliability of the allocation using the determined relative frequency values, the minimum difference in amount of the relative frequency values can be determined for all the reception signals of the first and second transmitter group (i.e. the difference in amount of the minimum relative frequency value for a reception signal from the first transmitter group and the maximum relative frequency value for a reception signal from the second transmitter group) and compared with a predetermined additional reliability threshold value, in which case a positive test result is assumed if the minimum difference in amount is greater than the additional reliability threshold value and in which case a negative test result is assumed if the minimum difference in amount is less than the additional reliability threshold value.

According to the preferred embodiment of the invention, the discriminator threshold value can then be determined depending on the characteristic parameters of the relevant reception signals. In this case, the discriminator threshold value can then, for example, depending on the detected average values of the smallest reception signal of the first transmitter group and the largest reception signal of the second transmitter group, be determined preferably at a relative interval from one of the average values of these two reception signals or as a ratio with regard to one of the average values of these two reception signals.

By means of this method, a drift in the average powers of the reception signals can be compensated for. To this end, a predetermined starting value is preferably used for the discriminator threshold value in an initial state of the method. In the case of a repeated implementation of the method, the discriminator threshold value which has been determined anew in the preceding allocation process can then be used in subsequent methods. This has the advantage that it requires both minimal computation effort and a small memory. This is as a result of the fact that each reception signal only requires one numerator which represents the number of values above or below the discriminator threshold value.

If the computation efforts and the memory capacity are not important, then all the discrete values for the reception signals can as a matter of course also be stored and determined within the framework of a corresponding evaluation of the optimum discriminator threshold value. This can then also be used for the current allocation method.

Further embodiments of the method and the device according to the invention can be found in the subclaims.

The invention is described in more detail with reference to the drawings and on the basis of the preferred embodiments. They are as follows

BRIEF DESCRIPTION OF THE DRAWINGS

FIG. 1 a schematic diagram of a motor vehicle with a device for monitoring at least one parameter for a plurality of wheels pertaining to a motor vehicle and FIG. 2 diagrams with exemplary fictitious curves of reception signals depending on the angle position of the relevant wheel.

DESCRIPTION OF THE INVENTION

The motor vehicle 1 shown schematically in FIG. 1 has a device 3 for monitoring at least one parameter for a plurality of wheels pertaining to a motor vehicle 1 and which includes a central evaluation and control unit 5 and four detector units 7, 9, 11, 13. The device 3 includes or at the same time serves as a device for localizing the position of emission units. One detector unit 7, 9, 11, 13 is allocated to one of the wheels 15, 17, 19, 21 of the motor vehicle 1 or fitted to said wheel and also fitted to said wheel when it is rotating.

Each of the detector devices 7, 9, 11, 13 includes an emission unit 7*a*, 9*a*, 11*a*, 13*a*. Each of the emission units 7*a*, 9*a*, 11*a*, 13*a* transmits a short frequency or phase-modulated signal at predetermined times which, for the sake of information, includes a specific identification code for each detector device 7, 9, 11, 13 and possibly a value for the parameter of the wheel to be monitored. However, the latter is not required in the allocation mode. The specific identification code and the value of the parameter are preferably implemented in the form of digital information or in the form of a digital signal which is used as a modulation signal for the carrier signal of the transmitted signal.

The signals sent by the detector units 7, 9, 11, 13 or their emission units 7*a*, 9*a*, 11*a*, 13*a* are received by the evaluation and control unit 5 by means of one of these included receiver units 23. The receiver unit 23 demodulates the reception signal and in this way enables the evaluation and control unit 5 to preferably evaluate the digital information signals, i.e. the specific identification code and the value for the parameter to be monitored. However, the latter is only mandatory in the normal monitoring mode.

The evaluation and control device 5 carries out collision monitoring which, if a plurality of detector units 7, 9, 11, 13 transmit at the same time, prohibits an evaluation.

In order to avoid the costs of a bidirectional signal transmission between the detector units and the evaluation and control unit, the detector units can be embodied in such a way that they transmit their signals at random intervals in time, in which case a specific range of values can of course be provided for the interval in time. This avoids two detector units always transmitting simultaneously at the same intervals over a longer period in time.

The periodically transmitted signal (telegram) can, for example, be transmitted at a predetermined interval of a few seconds and have a telegram duration of a few hundred milliseconds. The telegram can consist of a plurality of parts, e.g. a plurality of short parts in time in which a signal is actually transmitted, which are in each case separated by a pause of a specific duration in time.

During normal operation, the evaluation and control unit 5 from the specific identification code of a reception signal alone, can make an allocation of the value for the parameter to be monitored to the position of the wheel because in an allocation mode previously carried out, the allocation of each specific identification code to a position of the wheel was made and stored.

The allocation mode can, for example, be activated by the fact that each of the detector units 7, 9, 11, 13 includes a sensor (not shown) which reacts to accelerations in which case the detector units switch to the allocation mode if no acceleration and with that no rotation of the wheels is detected for a specific time span. In the allocation mode, the signals can be transmitted at shorter intervals than is necessary during normal operation. Because of this, a quicker implementation of the allocation process is made possible. In the allocation mode, it is not mandatory that the signals also have to contain information about a value of the parameter to be monitored. It is more than sufficient in this case if a signal contains the specific identification code of the relevant detector unit 7, 9, 11, 13.

At this point it should be mentioned that the duration of a signal in time (implied here is the duration of a telegram part while a signal is actually transmitted) in both normal operation and in the allocation mode is small compared to the duration in time required by a wheel in the case of a maximum permissible speed for a full revolution. Typically, the duration in time of a signal is approximately 1 millisecond to 100 milliseconds, for example, 10 milliseconds. This short signal duration makes it possible, via the average signal power at the receiving point of the evaluation and control unit 5, to characterize the associated angle position of the relevant wheel without an undesired integrating effect being generated by the rotation of the wheel.

In the allocation mode, the evaluation and control unit 5 detects the average signal power at the receiving point in which case for this purpose, the receiver unit 23 generates a signal which represents a measurement for the average signal power of the received phase-modulated or frequency-modulated signals.

FIG. 2 shows a fictitious example of the four signal curves of the reception signals of the individual emission units 7*a*, 9*a*, 11*a*, 13*a* depending on the angle position of the relevant wheels. Because in the said embodiment, only a short telegram section of the signal or its average value is always detected, the signal curves shown in FIG. 2 are produced if a plurality of such discrete values would be detected for each reception signal and the angle position allocated.

However, for the desired simple evaluation, the computation efforts should not be extensive and the memory should be kept as small as possible so that a detection of the angular position of the wheels should also be dispensed with if possible. Also storing the individual discrete values for the relevant reception signals should be dispensed with if possible.

To this end, the individual discrete values of the reception signals can be summed and averaged. In this case, the evaluation and control unit controls the detection processes in such a way that for each reception signal a minimum number of values, for example, 64 values are detected. There is no requirement here for the same number of discrete values to be detected for each reception signal.

The average values (shown as a dashed line in FIG. 2) determined in such a way for each reception signal can then be used for the allocation process. For reasons of a more simple and reliable localizing (allocation of a reception signal to an emission unit or its local position), only axle localizing is carried out below. To this end, for a specific reception signal it should only be determined whether or not the relevant emission unit is in the wheel positions on the front axle or the rear axle of the motor vehicle. Because standardized emission units with more or less the same transmitting power are usually used, the receiver antenna of the receiver unit is preferably fitted asymmetrically in the motor vehicle, closer to the front axle of the motor vehicle 1, for example, as shown in FIG. 1. That is why the averaged discrete values of the reception signals, for the emission units 7a, 9a, in the wheel positions on the front axle are higher than the averaged discrete values of the reception signals for the emission units 11a, 13a in the wheel positions on the rear axle. This can also be seen from the fictitious signal curves in FIG. 2. For the reception signals in FIGS. 2a and 2b in the case of the emission units in the wheel positions of the rear axle, lower average values are produced than in the case of the emission units in the wheel positions of the front axle. However, the average values in the wheel positions of the same axle can hardly be differentiated.

The allocation which is carried out in the allocation mode of the evaluation and control unit (5), can in this simple case of axle localizing simply be brought about by allocating the two reception signals with the higher average values to the front axle and the two reception signals with the lower average values to the rear axle. The actual allocation takes place by storing the identification code of the emission units for the relevant information or region information (i.e. for example "front axle" or "rear axle").

However, also the differences in the average values of the different axles can be relatively small so that it should be examined whether or not the allocation or localizing carried out in such a way produces a sufficient reliability.

To this end the minimum interval of the average values of the reception signals of the two emission units on the front axle can be determined from the average values of the reception signals of the two emission units on the rear axle. In other words, the lowest average value of the relevant reception signal of an emission unit on the front axle is compared with the highest average value of the relevant reception signal of an emission unit on the rear axle. Instead of using an absolute difference in amount of the values to be compared it is recommended that a ratio of the two values be used in which case the reliability of a correct localizing increases with the interval of the quotient of 1. Below it is assumed that the quotient is formed in such a way that the higher value stands in the numerator position and the lower value in the denominator position in each case, i.e. the quotient is basically higher than 1. The ratio determined in this way is compared with a threshold value of reliability in which case a correct allocation is assumed if the quotient is greater than the threshold value of reliability. In this case, the localizing process ends.

If the quotient is less than the threshold value of reliability, an additional criterion is used for the allocation.

For this purpose, the number of discrete values detected for each of the reception signals which lie above a predetermined discriminator threshold value is for example suitable. This discriminator threshold value will preferably be selected in such a way that it is between the lowest average value of the reception signals of the control units on the front axle and the highest average value of the reception signals of the emission units on the rear axle. The optimum position of the discriminator threshold value in this case depends on the fictitious curve of the reception signals as a function of the position of the wheel (cf. FIG. 2). As starting value for the discriminator threshold value, a predetermined fixed value or a value with a predetermined interval from the lowest average value of the reception signals of the emission units on the front axle can be selected. Therefore, the interval can be predetermined as an absolute value or as a ratio with regard to the relevant average value.

The discriminator threshold value can also be determined anew in the case of each localizing process. However, it is also possible that the new discriminator threshold value is only used in the next localizing process in each case if the individually detected, discrete average values are not stored.

Because of this, a method is developed which adapts itself automatically to possible changes in the parameters or the environmental conditions. In this way, it is in particular possible that the effects of a drift of the transmitting power can be compensated for or moderated.

The allocation or localizing then again takes place in such a way that the two reception signals which supply most of the values above the discriminator threshold value or the relevant emission units are allocated to the front axle and the two reception signals which supply the fewest values above the discriminator threshold value or the relevant emission units are allocated to the rear axle. Instead of the absolute numbers for values above the discriminator threshold value, relative frequencies can also be used. These are determined by dividing the absolute numbers by the number of values actually detected for the relevant reception signal.

The allocation result which is determined with this additional decision criterion can also be checked with regard to the presence of sufficient reliability with a suitable reliability criterion. For this purpose, the interval of the relative frequencies of the reception signals which have the second and third highest frequencies can for example be examined; in other words, the reception signal is used which is allocated to the front axle according to the relevant allocation criterion and, of the reception signals of the emission units of the front axle, has the lowest frequency value, and the reception signal which is allocated to the rear axle according to the relevant allocation criterion and, of the reception signals of the emission units of the rear axle, has the highest frequency value. To this end, the interval of the relative frequencies can then again be expressed relatively, i.e. as a ratio or an absolute value. By comparing the interval with an additionally predetermined reliability threshold value, a statement can be made with regard to a sufficient or insufficient reliability for the allocation carried out according to the relevant allocation criterion.

If the application of this additional allocation criterion produces the same allocation as the allocation criterion previously used and if this reliability test produces a positive statement, i.e. if the interval is greater than the reliability threshold value (for the case that the relative frequencies are compared by the formation of a ratio, if a quotient greater than 1 should again be assumed), the allocation process ends successfully.

If the allocation leads to another result, the method is terminated as unsuccessful and started anew and/or an error signal or an error message generated.

Should the allocation lead to the same result, but the reliability test does not signal a sufficient reliability, a third allocation criterion is used according to the special embodiment explained here.

For this purpose, the maximum value or the minimum value is in each case determined while detecting the discrete average values for the reception signals. In this case it is also assumed that the reception signals of emission units on the front axle in each case have higher maximum values or lower minimum values than the reception signals of the emission units on the rear axle and have carried out a corresponding allocation.

However, if this allocation also leads to the same result as the application of the two allocation criteria previously explained, the method ends successfully, otherwise it is terminated as unsuccessful and restarted and/or an error signal generated.

However a corresponding reliability criterion can of course also be used for this method, for example the interval between the maximum values and/or the minimum values which can be determined analogously to the method described above and compared with a reliability threshold value. In the case of a negative reliability statement, an unsuccessful termination of the method could then also be carried out.

This produces a method and a device which overall make it possible, in the simplest way and with the required reliability, to carry out an allocation or localizing of the reception signals or the corresponding transmission units to positions or regions.

We claim:

1. A method of localizing a position of at least two emission units, which comprises:
   (a) assigning a portion N of the emission units to a first transmitter group and assigning another portion M of the emission units to a second transmitter group, and assigning a local region to each transmitter group;
   (b) detecting transmission signals emitted by the emission units with a receiver antenna of a receiver unit of an evaluation and control unit;
   (c) wherein a reception power of the reception signals from the emission units of the first transmitter group is in each case appreciably higher than a reception power of the reception signals from the emission units of the second transmitter group over a long time span in each case;
   (d) averaging the reception power of at least two reception signals over a predetermined time span or a predetermined number of discretely scanned values of the reception power or over a predetermined number of intermittently transmitted signals;
   (e) allocating N reception signals with N highest average values or the respective emission units to the first transmitter group, and allocating M reception signals with M lowest average values or the respective emission units to the second transmitter group;
   (f) determining the reception signal of the first transmitter group with a smallest average value and the reception signal of the second transmitter group with a highest average value, and comparing a difference in amount of the smallest and highest average values or a ratio thereof with a predetermined reliability threshold value;
   (g) accepting the allocation of the reception signals or the respective emission units of the first or second transmitter groups or the local regions allocated thereto as being correct only if the difference in amount or the ratio of the average values is greater than the reliability threshold value; and
   (h) if the difference in amount or the ratio of the average value is less than the reliability threshold value, using at least one additional decision criterion for allocating the reception signals or the respective emission units to the transmitter groups or the local regions thereof, and/or an additional criterion for testing a reliability of a correct allocation.

2. The method according to claim 1, wherein step h) comprises using additional characteristic variables of the reception signals.

3. The method according to claim 1, which comprises accepting an end result of the allocation as being correct only if all allocation results, derived by using the one decision criterion or a plurality of the additional decision criteria, correspond with the first allocation result.

4. The method according to claim 3, which comprises accepting the end result of the allocation as being correct even if the first and also all the additional decision criteria for testing the reliability of a correct allocation yield a negative result.

5. The method according to claim 1, which comprises intermittently scanning the reception signals or transmitting intermittent signals, and determining as an additional characteristic variable for the reception signals, a number of discrete reception signal values greater or less than a predetermined discriminator threshold value.

6. The method according to claim 5, which further comprises detecting a minimum number of discrete reception signal values for each reception signal and determining for each reception signal a relative frequency of the reception signal value above or below the threshold value.

7. The method according to claim 6, which comprises testing the reliability of the allocation when the determined relative frequency values are used, by determining a minimum difference in amount of the relative frequency values for all the reception signals of the first and second transmitter group and comparing with a predetermined additional reliability threshold value, and, assuming a positive test result if the minimum difference in amount is greater than the additional reliability threshold value and assuming a negative test result if the minimal difference in amount is less than the additional reliability threshold value.

8. The method according to claim 7, which comprises determining the discriminator threshold value in dependence on the characteristic parameters of the relevant reception signals.

9. The method according to claim 8, which comprises determining the discriminator threshold value depending on the detected average values of the smallest reception signal of the first transmitter group and the largest reception signal of the second transmitter group.

10. The method according to claim 8, which comprises determining the discriminator threshold value depending on the detected average values of the smallest reception signal of the first transmitter group and the largest reception signal of the second transmitter group at a relative interval from one of the average values of the two reception signals or as a ratio with regard to one of the average values of the two reception signals.

11. The method according to claim 7, which comprises, upon initiating the method, using a predetermined starting value for the discriminator threshold value, and, upon a repeated implementation of the method, using in subsequent processing a discriminator threshold value that has been determined anew in a respectively preceding allocation process.

12. The method according to claim 1, which comprises monitoring at least one parameter for a plurality of wheels pertaining to a motor vehicle.

13. A device for localizing the positions of at least two emission units, comprising:

(a) a plurality of emission units including a portion N of said emission units assigned to a first transmitter group and a portion M of said emission units assigned to a second transmitter group, each transmitter group having a local region assigned thereto;

(b) an evaluation and control unit having a receiver unit and a receiving antenna for detecting signals transmitted by said emission units;

(c) wherein a reception power of the reception signals from said emitters of said first transmitter group is in each case sufficiently higher than a reception power of the reception signals from said emitters of said second transmitter group over a long time span in each case;

(d) said evaluation and control unit being configured to detect and average the reception power of at least two reception signals over a predetermined time span or to in each case discretely scan and average a predetermined number of values of the reception power of the reception signals or in each case to detect and average a predetermined number of signals sent intermittently;

(e) said evaluation and control unit allocating N reception signals with the N highest average values, and the respective said emission units, to said first transmitter group, and allocating M reception signals with the M lowest average values, and the respective said emission units, to said second transmitter group;

(f) said evaluation and control unit determining the reception signal of said first transmitter group with the lowest average value and the reception signal of said second transmitter group with the highest average value and comparing a difference in amount of the average values, or a ratio of the average values, with a predetermined reliability threshold value;

(g) said evaluation and control unit accepting an allocation of the reception signals, or the respective said emission units, to the first or the second transmitter group or to the locally allocated regions to be correct only if the difference in amount or the ratio of the average values is greater than the reliability threshold value; and (h) said evaluation and control unit, if the difference in amount or the ratio of the average value is less than the reliability threshold value, utilizing at least one additional decision criterion for allocating the reception signals, or the respective said emission units to the transmitter groups or the local regions, and/or utilizing an additional criterion for testing the reliability of a correct allocation.

14. The device according to claim 13, wherein, if the difference in amount or the ratio of the average value is less than the reliability threshold value, said evaluation and control unit is configured to use additional characteristic variables of the reception signals.

15. The device according to claim 13 configured for monitoring at least one parameter of a plurality of wheels of a motor vehicle.

16. The device according to claim 15, wherein a respective said emission unit is mounted in each wheel position of the motor vehicle, and said emission units at the wheel positions of a rear axle are associated with the first transmitter group and said emission units in the wheel positions of a front axle are associated with the second transmitter group.

17. The device according to claim 13, said receiver antenna is positioned and oriented to define the reception power of the reception signals from said emitters of said first and second transmitter groups to be different.

18. The device according to claim 13, wherein said evaluation and control unit is configured to implement the method according to claim 1.

* * * * *